United States Patent [19]
Steward et al.

[11] Patent Number: 4,863,791
[45] Date of Patent: Sep. 5, 1989

[54] SOUND ABSORPTION IN FOAM CORE PANELS

[75] Inventors: Raymond G. Steward, Port Huron; Stuart G. Boyd, North Street, both of Mich.

[73] Assignee: United Technologies Automotive, Inc., Dearborn, Mich.

[21] Appl. No.: 220,653

[22] Filed: Jul. 18, 1988

Related U.S. Application Data

[62] Division of Ser. No. 34,457, Apr. 6, 1987, Pat. No. 4,781,774.

[51] Int. Cl.[4] .............................................. G32B 3/26
[52] U.S. Cl. .................. 428/310.5; 181/288; 181/294; 428/314.2; 428/314.4; 428/316.6
[58] Field of Search ............... 428/304.4, 310.5, 314.2, 428/314.4, 314.8, 316.6, 318.8; 181/286, 288, 293, 294

[56] References Cited

U.S. PATENT DOCUMENTS

| | | | |
|---|---|---|---|
| 3,698,993 | 10/1972 | Rauh | 428/314.8 |
| 4,469,736 | 9/1984 | Machholz | 181/288 |
| 4,615,411 | 10/1986 | Breitschecdel et al. | 181/294 |

FOREIGN PATENT DOCUMENTS

53-54267  5/1978  Japan ................................ 428/304.4

*Primary Examiner*—William J. Van Balen

[57] ABSTRACT

A method of manufacture of a foam core board is described as well as vehicle trim panels made from such board. A foam board having a cell structure including a structure with large cells in a center portion is initially formed. This board is skived into two separate panels, each having one surface with relatively large cell structure and wherein said cells have been opened by the skiving process. This surface acts to promote enhanced sound absorption from the foam core board. This board may be laminated with appropriate decorative material and molded to make contoured resilient vehicle trim panels.

5 Claims, 2 Drawing Sheets

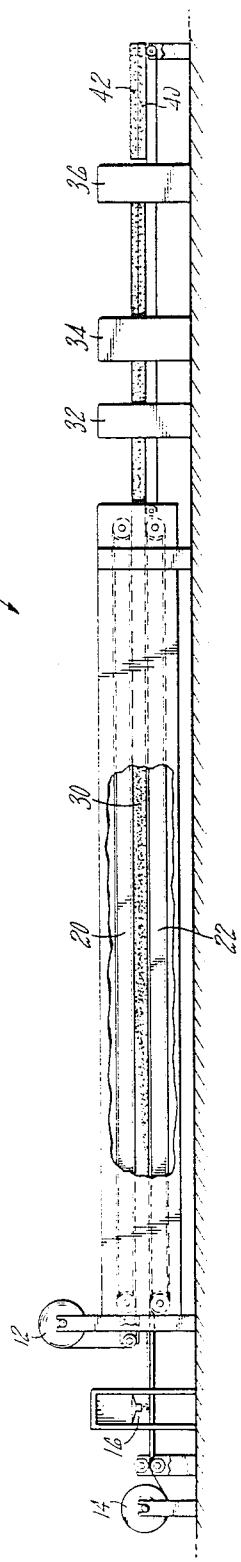
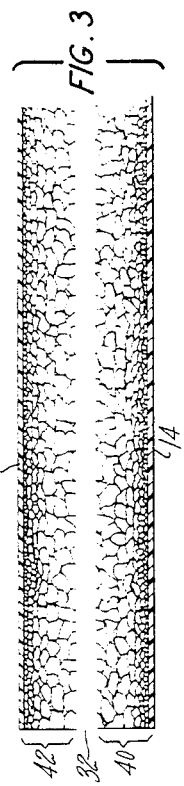
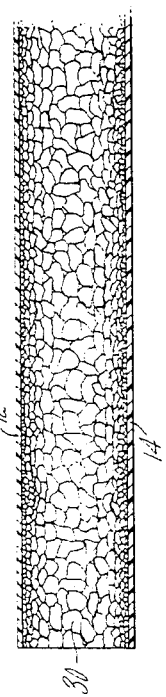
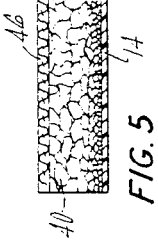
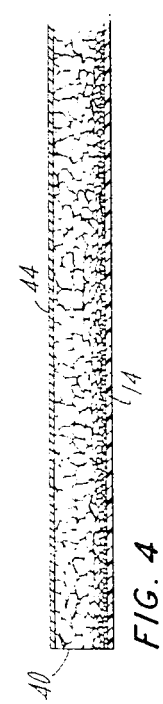

SOUND ABSORPTION IN FOAM CORE PANELS

This is a division of application Ser. No. 034,457 filed Apr. 6, 1987, now U.S. Pat. No. 4,781,774.

BACKGROUND OF THE INVENTION

The present invention is directed to a method of manufacture of foam core panels having improved sound absorption capabilities. The present invention is further directed to the panels produced using this method, especially vehicle trim panels.

The inventions disclosed herein have particular applicability to the manufacture of interior trim panels for use in motor vehicles using polyurethane foam core panels manufactured with equipment having moving and/or stationary belts, platens, and/or molds which control the foam core thickness. Such panels may also be used as ceiling and wall panels for buildings as well as interior components for motor vehicles.

It is known in the art to manufacture composite structures having a semirigid polyurethane foam core using a combination of moving and/or stationary belts, platens, and/or molds which control the foam core thickness by restricting the total free-rise foaming of the selected chemical composition. The use of this method tends to create a foam core having increased density at the upper and lower portions and decreased density at the center portion. This density variation results in a closed cellular structure of relatively large size in the center portion creating a less dense portion and a closed cellular structure at or near the surfaces including the top and bottom portions having a smaller cell size creating a more dense portion. The smaller cell structure at the surfaces is due to the restriction impeding the free-rise foaming of the chemical composition created by the belts, platens, or molds being preset to uniformly control the entire panel thickness.

It is known that polyurethane foam composites having increased density and closed cellular structures do not exhibit the best sound absorption characteristics, and that increased sound absorption ability is desired in some applications. The methods used to increase the sound absorption capability of such foam composites include creating perforations or depressions into or through the surface of the composite structure or to laminate thereto additional materials that exhibit improved sound absorption characteristics.

Another method of manufacture of polyurethane foam composite structures is to form foam buns and thereafter to trim off the densified exterior surfaces. This trimmed bun is then cut to the desired end part thickness and thereafter secondary bonding of reinforcement and decorative cover materials is made to the shaped bun. The products manufactured using these methods may or may not be aesthetically appealing and are somewhat costly to manufacture.

The herein invention is directed towards using a current state of the art process for manufacturing a thermoformable semirigid polyurethane foam and thereafter skiving the panel produced through a center portion having a large cell structure to create two distinct panels each having one surface with a large cell structure, and said surface additionally including cells that have been cut open. Hence, a surface having increased sound absorption characteristics is provided on two foam panels which are made simultaneously from a single panel originating from a conventional process.

SUMMARY OF THE INVENTION

It is an object of the present invention to provide a method of manufacturing of foam core panels having improved sound absorption characteristics.

It is a further object of the present invention to provide a method of manufacturing a pair of foam panels from a single foam panel, each of the pair of panels having improved sound absorption capabilities.

It is yet another object of the present invention to provide means for manufacturing a vehicle trim panel having improved sound absorption characteristics.

It is a yet further object of the present invention to provide an improved method of manufacturing multiple trim panels from an existing method of manufacturing larger foam panels.

Another object of the invention is to provide a safe, economical, reliable and easy to manufacture and assemble vehicle trim panel.

A still further object of the invention is to provide a safe, economical, reliable and consistent method of manufacture of foam panels.

Other objects will be apparent from the description to follow and the appended claims.

The above objects are achieved according to a preferred embodiment of the invention by the provision of a method of manufacturing a foam core panel having improved sound absorption characteristics. The method includes the steps of forming a foam panel between a top means and a bottom means which dimensionally limit the thickness of the panel, said panel having a nonuniform cellular structure such that the panel has a larger cell structure at the center portion and a smaller cell structure at the top and bottom portions. Thereafter, the foam panel is skived through the center portion having a large cell structure to make two panels, each having an exterior surface that has a large cell structure and has open cells to thereby improve the panels sound absorption characteristics.

Additionally disclosed is a method of manufacturing a vehicle trim panel having improved sound absorption characteristics which includes skiving a closed cell foam panel, having a center portion with large cell structure and top and bottom portions of smaller cell structure, through the center portion to form two panels, each having a surface with a large cell structure and a multiplicity of open cells to enhance the panels sound absorption characteristics, and laminating a decorative covering to the surface of the open cells on each panel, said covering allowing sound energy to pass therethrough to be absorbed within the open cells of the panel.

Further disclosed is a vehicle trim panel having improved sound absorption characteristics. The trim panel includes a foam core of varying density, said core having one surface of high density and a small cell structure, and a second skived surface of low density and large cell structure. The cell structure of the skived surface further includes numerous open cells to promote sound absorption. A decorative layer is placed over the skived surface, said layer allowing sound energy to pass therethrough for absorption within the open cells of the foam core.

BRIEF DESCRIPTION OF THE DRAWINGS

FIG. 1 is a schematic drawing of a foam core board lamination system.

FIG. 2 is a cross-sectional view of a foam core board with top and bottom facing materials showing the board's cell structure.

FIG. 3 is a cross-sectional view of a foam board showing the board skived through the center thereof.

FIG. 4 is a cross-sectional view of a foam board panel having interface material applied thereto.

FIG. 5 is a cross-sectional view of a foam board panel having decorative covering material applied thereto.

BRIEF DESCRIPTION OF THE PREFERRED EMBODIMENT

Figure 6:
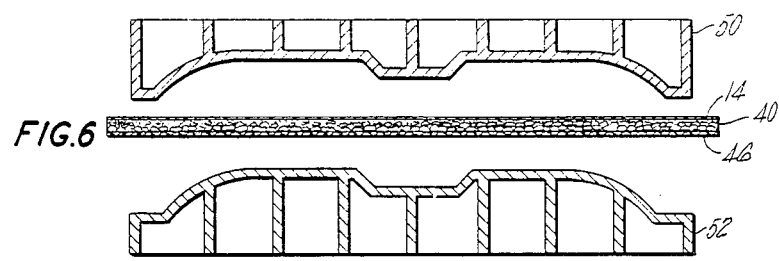
FIG. 6 is a schematic view of a foam board panel about to be inserted into a mold.

The invention herein will be described with reference to a specific lamination system for manufacturing foam core boards. It is understood that other methods of manufacturing foam core boards wherein the size of the board in the thickness direction is constrained would likewise create boards having similar cell structure to that shown herein.

It is further to be understood that although the herein invention is described with particular reference to foam core boards made utilizing polyurethane foam material that any chemical composition appropriately formed would serve the same function.

Referring to FIG. 1, there may be seen a foam board lamination system 10. This system includes bottom facing material 14 and top facing material 12 which are unrolled and passed through a conveyor system. The conveyor system includes top platen conveyor 20 and bottom platen conveyor 22 which collectively define therebetween the thickness to which the foam material may expand. Foam chemical dispenser 16 is shown located to dispense chemical material such as polyurethane foam material onto the top of the bottom facing material. This bottom facing material carries the foam material into the area between the conveyors such that the foam material is contained between the bottom facing material supported by the bottom platen conveyor and the top facing material supported by the top platen conveyor. Foam material 30, as shown, expands and occupies the entire space therebetween. Once the foam material expands, a board consisting of foam material and the two facing materials exits from the conveyor portion. Edge trimmer 32 is provided to trim the edges of the board as it travels through the system. Horizontal splitter 34 is located to skive the board into multiple foam board panels. Cutoff mechanism 36 cuts the boards into selected lengths depending upon the desired end use. At the end of the lamination system there may be seen foam board panels 40 and 42 stacked one on top of the other. Each board has foam material and each has a facing material located on either the top or the bottom side. Both boards are identical and are stacked open face to open face.

A normal sequence for this type of operation includes presetting the distance between the upper and lower conveyor platens to twice the desired finished product thickness to be maintained. This equipment may typically have the capability of controlling panel thickness with excellent uniformity for panels between one tenth of an inch to three and one half inches thick.

The top facing material and bottom facing material, as referenced, may be paper, plastic films, natural or synthetic woven or nonwoven fabrics, fiberglass mats, and/or composites thereof. The temperature to be maintained on the conveyor platens is set to achieve the desired foam core depending on the composition used. The chemical material to make up the foam is typically dispensed in a uniform manner across the width of the bottom facing material prior to entering the conveyors.

Once the foam board panels 42 and 40 are produced via the foam board lamination system, secondary operations may occur. The secondary operations may include laminating additional materials that either may or may not add reinforcement to the board panels. Additional decorative coverings may be added to the interface of the split prelaminated semirigid polyurethane foam core and further operations may be added to mold the composite into a contour or a design, if polyurethane chemicals with the correct degree of thermoplasticity are utilized.

Referring now to FIG. 2, there may be seen a cross-sectional view of a typical foam board prior to passing through horizontal splitter. The foam material 30 is shown having bottom facing material 14 and top facing material 12 on the peripheries thereof. It may be seen that the cell structure adjacent the surfaces of the foam board is relatively small causing the material to be denser in this area. Additionally, it may be seen that the cell structure at the center portion of the foam material is relatively large causing the board to be less dense in the center portion.

FIG. 3 is identical to FIG. 2, but shows the foam material after it is passed through horizontal splitters 34. In FIG. 3, it may be seen that foam board panels 40 on the bottom and 42 on the top have been formed and slot 32 is provided therebetween. Additionally, it is seen that when the skiving process occurs, the horizontal splitter acts to open the large cells at the interface of the slot formed by the skiving process. It may also be seen that two identical foam board panels are formed by the skiving process each having a facing material on the exterior and each having an opposite surface with large cellular structure and with many open cells having enhanced sound absorption characteristics.

FIG. 4 shows foam board panel 40 having interface material 44 laminated to the large cell surface thereof. The purpose of this interface material may be merely to add strength to the board.

FIG. 5 shows foam board panel 40 having decorative covering material 46 secured or laminated to the large cell structure portion of the board. This decorative material may be sufficiently porous or sufficiently flexible to allow sound energy to be transmitted therethrough such that sound energy may be absorbed within the large open cells adjacent thereto. In a vehicle trim panel, this decorative covering material may be fabric or some other material as may be aesthetically pleasing to an occupant of a motor vehicle. This decorative covering may be applied to the core board prior to, during or after molding.

Figure 7:
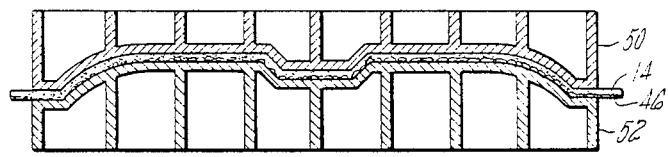
FIG. 7 is a schematic view of a foam core board panel as molded and located within a mold in the closed position.
Figure 8:
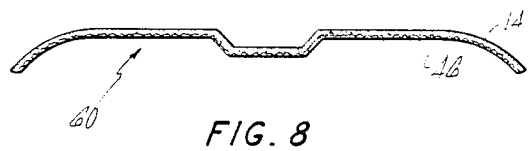
FIG. 8 is a cross-sectional view of a contoured vehicle trim panel.

Referring now to FIGS. 6-8, there is a simple description of the molding process to manufacture a contoured vehicle trim panel from board panel 40. In FIG. 6, there may be seen that a preheated foam board panel 40 is placed between the top portion of mold 50 and the bottom portion of mold 52. Bottom facing material 14 and decorative layer material 46 is shown on either side of foam board panel 40 prior to molding process.

FIG. 7 shows the foam board panel secured between the top and bottom portions of the mold with the mold being in the closed position. FIG. 8 shows contoured vehicle trim panel 60 molded to the desired end configuration.

Producing semirigid polyurethane foam core panels using the method herein described offers both improved acoustical characteristics and potential economic efficiencies. The improved acoustical characteristics are obtained by the splitting of the foam core board to open additional foam cells as the board is split through the composite structure at a point where the foam is in greatest uniformity and least densified. By the utilization of this skived surface as the cosmetic side of the product, an improved acoustical characteristic can be obtained. Improved economics are achieved through the initial lamination operation by producing a foam core board of double thickness and splitting said board to obtain two individual foam core boards at the end of the process.

The invention herein has been described with reference to particular embodiments. It is to be understood by those skilled in the art that variations and modifications can be effected within the spirit and scope of the invention.

We claim:

1. A vehicle trim panel having improved sound absorption characteristics which comprises:
   a foam core of varying density, said core having one surface of high density and a small cell structure and a second skived surface of low density and large cell structure, said cell structure at the skived surface further including numerous open cells to promote sound absorption; and
   a decorative layer placed over the skived surface, said layer allowing sound energy to pass therethrough for absorption within the open cells of the foam core.

2. The apparatus as set forth in claim 1 and further comprising:
   a facing material secured to the oppside side of the foam core from the decorative layer.

3. The apparatus as set forth in claim 1 wherein said foam core and decorative layer are arranged in a predetermined configuration, said configuration having been determined by a molding process.

4. The apparatus as set forth in claim 3 wherein the trim panel is a motor vehicle headliner.

5. The apparatus as set forth in claim 3 wherein the trim panel is an interior panel of a motor vehicle.

* * * * *